5 Sheets—Sheet 3.

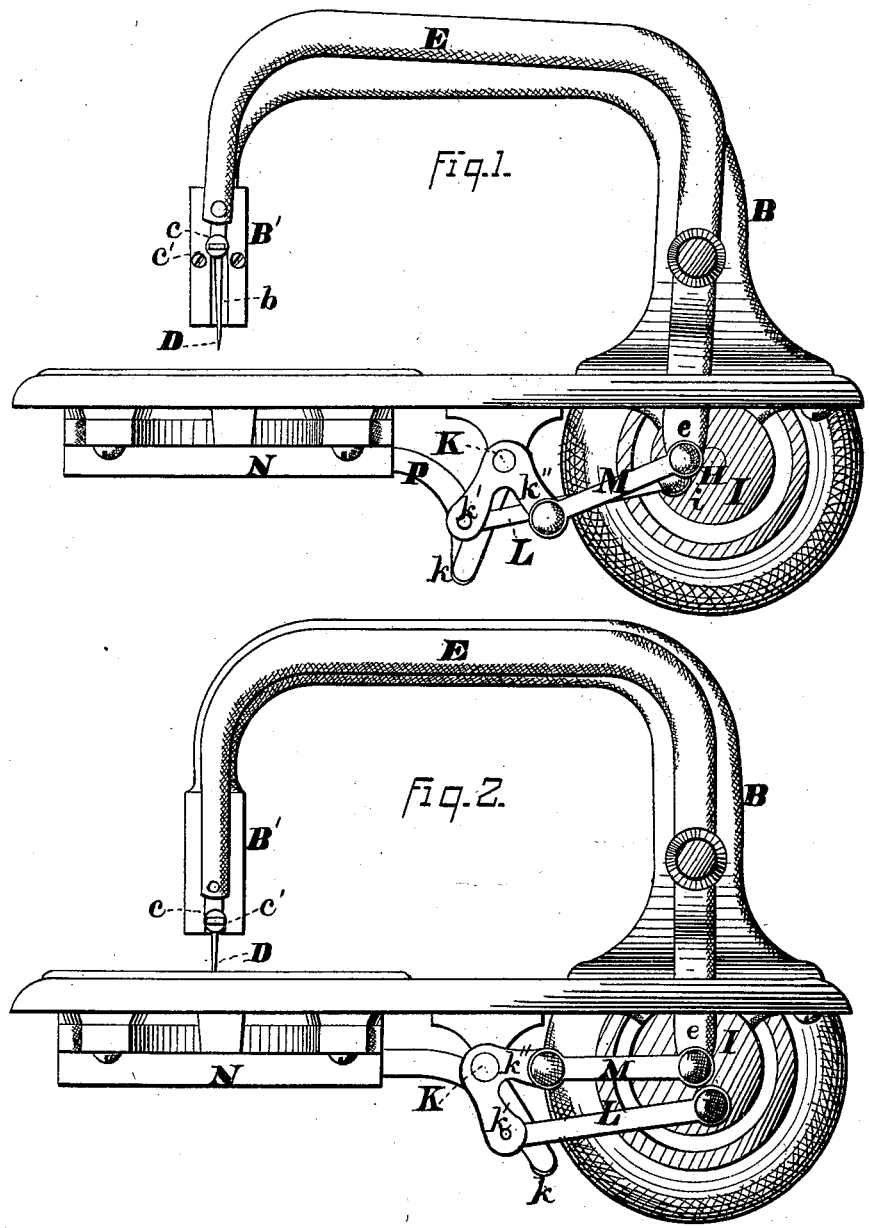

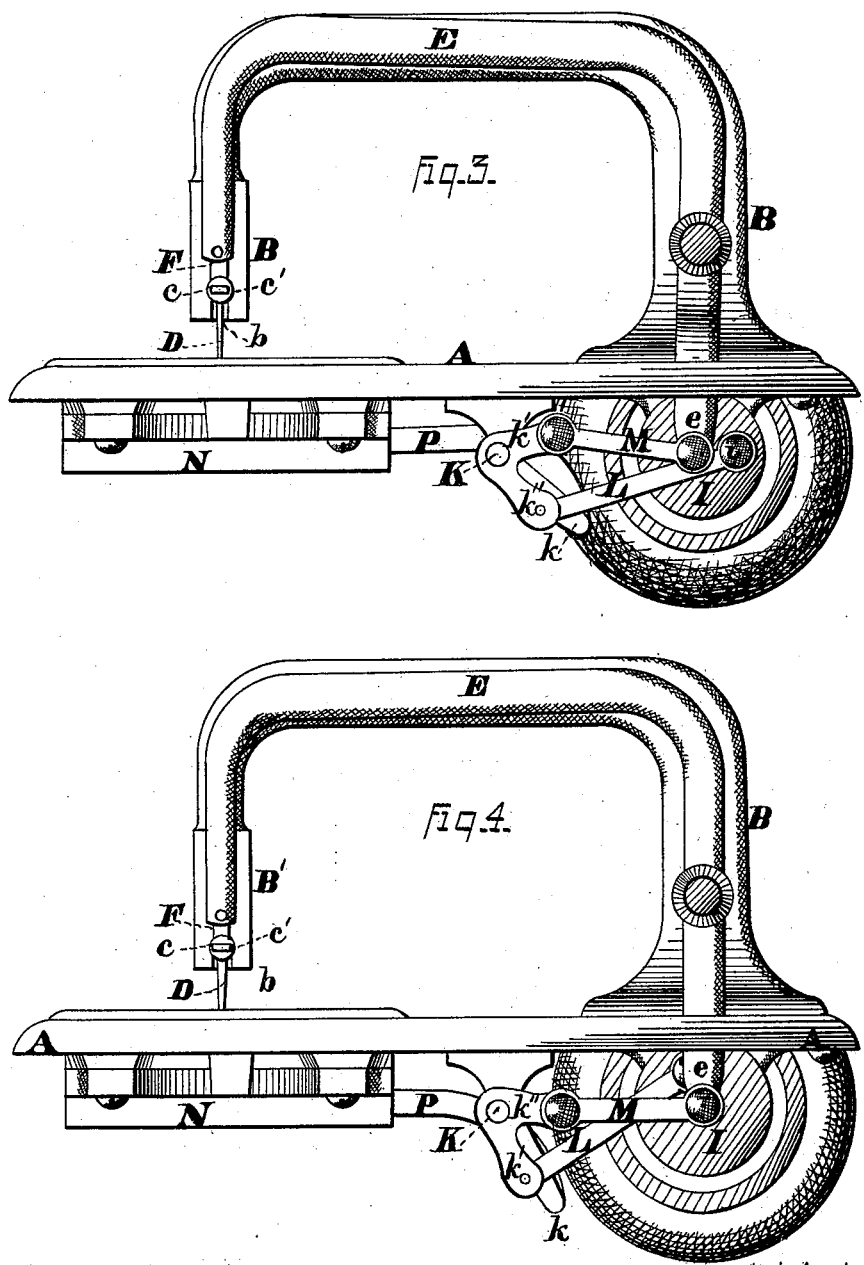

A. H. WAGNER.
SEWING-MACHINE.

No. 177,039. Patented May 2, 1876.

WITNESSES:
Jas. E. Hutchinson
John R. Young

INVENTOR
A. H. Wagner, by
Prindle and Co. his Attys

A. H. WAGNER.
SEWING-MACHINE.

No. 177,039.  
5 Sheets—Sheet 4.  
Patented May 2, 1876.

WITNESSES:  
Jas. E. Hutchinson  
John R. Young

INVENTOR.  
A. H. Wagner, by  
Prindle & Co, his Attys

5 Sheets—Sheet 5.
A. H. WAGNER.
SEWING-MACHINE.
No. 177,039. Patented May 2, 1876.
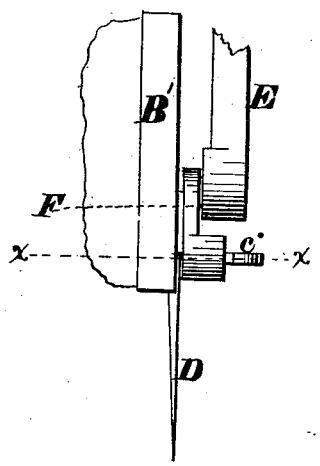
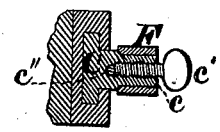
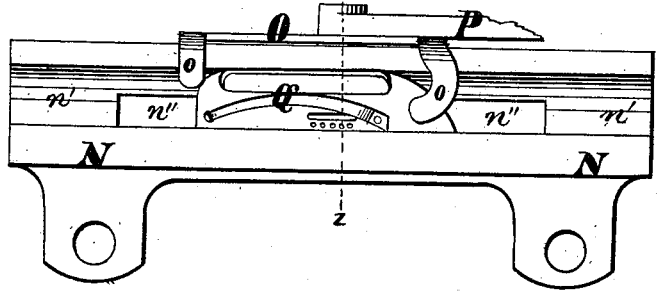
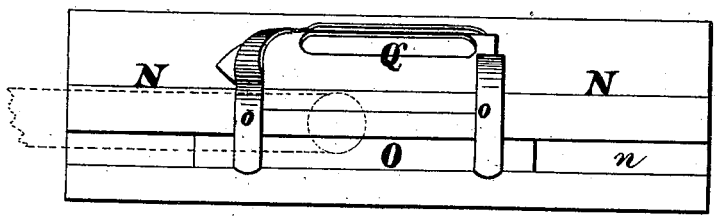
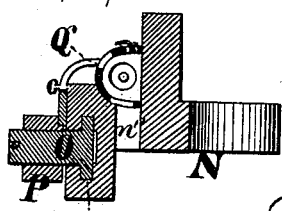
WITNESSES:
Jas. E. Hutchinson
John R. Young
INVENTOR.
A. H. Wagner, by
Prindle and Co. his Attys

UNITED STATES PATENT OFFICE.

AUSBERT H. WAGNER, OF CHICAGO, ILLINOIS.

IMPROVEMENT IN SEWING-MACHINES.

Specification forming part of Letters Patent No. 177,039, dated May 2, 1876; application filed April 10, 1875.

*To all whom it may concern:*

Be it known that I, AUSBERT H. WAGNER, of Chicago, in the county of Cook and in the State of Illinois, have invented certain new and useful Improvements in Sewing-Machines; and do hereby declare that the following is a full, clear, and exact description thereof, reference being had to the accompanying drawings, making a part of this specification, in which—

Figure 5:
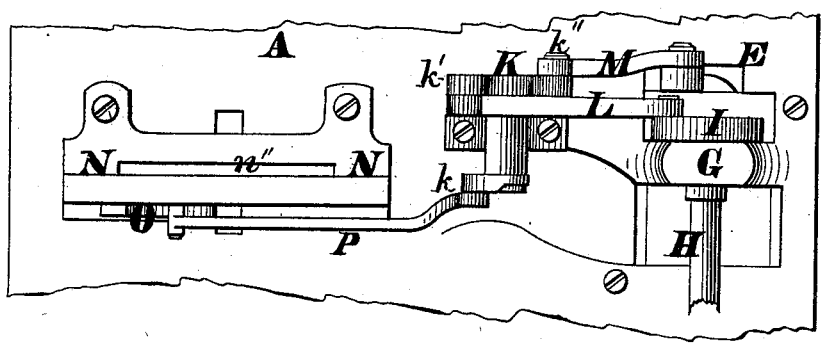
Figure 6:
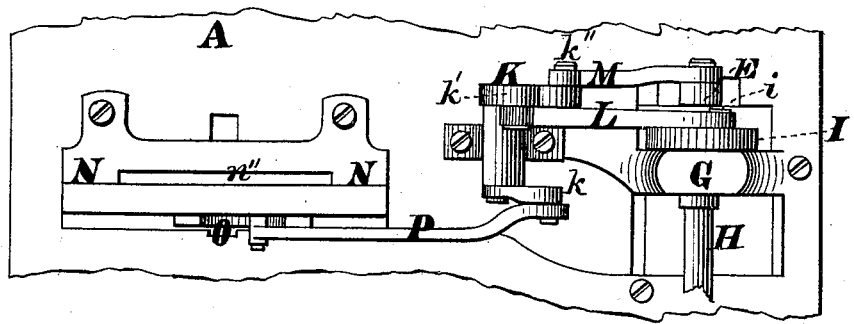
Figure 7:
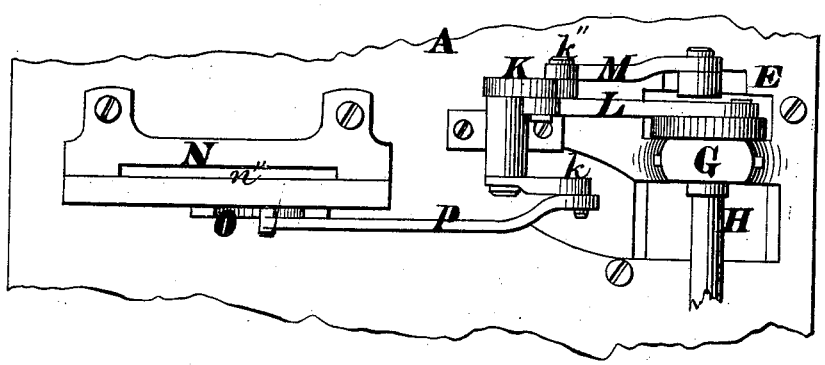
Figure 8:
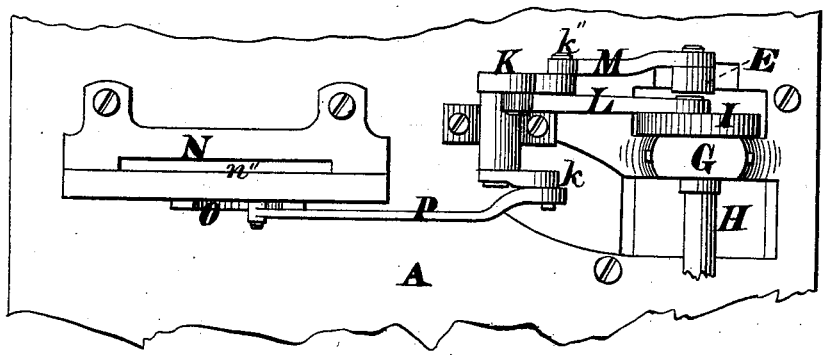

Figures 1, 2, 3, and 4 are side elevations of my improved machine, showing the relative positions of parts at different stages of each double movement of the needle. Figs. 5, 6, 7, and 8 are plan views of the lower side of said machine, showing respectively the positions of the operative mechanism represented in Figs. 1, 2, 3, and 4. Fig. 9 is an enlarged front elevation of the needle-head and its connecting parts. Fig. 10 is a horizontal section of the same upon line $x\ x$ of Fig. 9. Fig. 11 is a plan view of the upper side of the shuttle-race, with the shuttle and its carrier in position. Fig. 12 is a side elevation of the same, and Fig. 13 is a vertical section upon line $z\ z$ of Fig. 11.

Letters of like name and kind refer to like parts in each of the figures.

My invention has for its object, generally, an improvement in the construction and operation of sewing-machines; and it consists in the employment of a needle-head arranged to travel within a guide, in place of the usual needle-bar, substantially as and for the purpose hereinafter shown.

It consists, further, in the employment of an open or slotted shuttle-race, by means of which the lodgment of dust and lint within or upon the same is prevented, substantially as is hereinafter set forth.

It consists, further, in the construction of the shuttle-carrier and its combination with the shuttle-race, substantially as and for the purpose hereinafter shown and described.

It consists, finally, in combining the vibrating arm-journal upon the needle-head, with the bearing of the set-screw employed for securing the needle within said head, substantially as and for the purpose hereinafter specified.

In the annexed drawings, A represents the bed-plate of my machine, from the rear end of which extends upward, forward, and then downward, a fixed arm, B, upon the forward end of which arm is formed a head or housing, B', that has upon one side a T-shaped vertical groove, $b$, for the reception of the needle-head C.

The needle-head C fits loosely in the groove $b$, and projects slightly beyond the face of the housing B', and has vertically and horizontally substantially the same dimensions. A round boss, $c'$, projects horizontally from the outer face of said head, and at its axial center is provided with a threaded opening that receives a corresponding set-screw, $c$. A vertical opening, $c''$, is provided within said head for the reception of a needle, D, which opening intersects the said threaded opening, so that when said needle is in place said set-screw, $c'$ can be caused to bear against and confine the same in place.

The needle-head C is operated by means of a vibrating arm, E, of usual shape, which is pivoted upon the side and at the rear end of the fixed arm B, and is connected with said head by a short bar, F, that is journaled at one end upon the boss $c$, and at its opposite end is pivoted to or upon the forward end of said vibrating arm.

It will be seen that this method of connecting the vibrating arm with the needle-head at the point of attachment for the needle renders the application of power to the latter more direct, while by using the screw-boss for a journal greater simplicity is secured in the construction of said head.

By doing away with the usual needle-bar and substituting therefor the comparatively short needle-head, the vibration occasioned by the motion of the machine is lessened in proportion to the decrease in weight of said part.

Journaled within suitable bearings G and G, upon the lower side of the base-plate A, is a driving-shaft, H, which is directly beneath the rear end of the fixed arm B, and has a line at a right angle to the horizontal portion of the same. Upon one end of said shaft H, just inside of the lower end of the vibrating arm E, is secured a disk, I, which is provided upon its outer face with a crank-pin, $i$. At a short distance in front of the inner end of the shaft H is journaled a rock-shaft, K, which, upon one end, has a single radial arm, $k$, while upon its opposite end, which projects slightly beyond the outer face of the disk I, are two arms, $k'$ and $k''$, that radiate from said shaft upon lines that have a difference of angle of about sixty degrees. One of the arms $k'$ is connected with the crank-pin $i$ by means of a bar, L, that is pivoted at one end to or upon said crank-pin, and at its opposite end upon the end of said arm. The second arm $k'$ is in a like manner connected with the lower end $e$ of the vibrating arm E by means of a bar, M, which is pivoted to and extends between said parts.

This arrangement enables constant rotary motion of the shaft to be converted into an intermittent motion of the needle, which needle motions bear no relation, but are timed to accommodate the requirements of the shuttle. As seen in Fig. 1, the arms $k'$ and $k''$ are arranged so as to project downward at correspondingly opposite angles when the needle is at its highest point. When said needle has reached its next position—its lowest point—said arms have turned rearward and upward to the position shown in Fig. 2, the pivotal bearings of the connecting-bar M and the shaft K being in a line with each other.

While the rear end of the connecting-bar L is passing the rear center of its revolution, the arm $k''$ is moved slightly upward, as seen in Fig. 3, and causes the needle to be slightly raised so as to slacken the upper thread and permit the shuttle to enter its loop with greater ease, after which the continued movement of the operating-shaft causes said arm to move downward to the position shown in Fig. 4, and again depress said needle to its lowest point, so as to give additional thread to said loop. After reaching a second time the lowest point of its motion, the needle is raised rapidly to its first position by the continued movement of the driving-shaft.

The mechanism described gives to the needle all required motions and intervals of rest, with as great precision and certainty as could be obtained by use of a cam, while an important saving over the latter in friction, wear of parts, and in the cost of manufacture, is effected, and less noise and jar are produced by its operation.

Secured in proper position upon the lower side of the plate A is a shuttle-race, N, which, as seen in Figs. 11, 12, and 13, is provided upon one side with a dovetail or T-shaped groove, $n$, that receives and contains the body of the correspondingly-shaped carrier O, which carrier is operated by means of a bar, P, that is journaled at its rear end to or upon the arm $k$ of the rock-shaft K, and at its front end upon the outer side of said carrier.

From each end of the carrier O an arm, $o$, extends upward and then inward to the race or groove $n'$ for the reception of the shuttle Q, said arms having such relative positions as to cause them to embrace loosely the ends of said shuttle.

At the lower side of the groove $n'$ the race N is slotted vertically and longitudinally, and lint or dust from the needle are permitted to fall harmlessly through said slot $n''$ to the floor, instead of accumulating within said groove and obstructing the operation of said shuttle, as would otherwise be the case. The position of the groove $n$ also protects it from falling lint, and prevents obstruction to the carrier, while, from the shape of said groove and carrier, a better result is obtained, at a less original cost, than is possible with parts of ordinary construction.

Having thus fully set forth the nature and merits of my invention, what I claim as new, is—

1. In combination with the needle D and housing B$'$, having the vertical groove $b$, the head C, as described, fitted into and moving within said groove, and provided with suitable means for the attachment of said needle, substantially as and for the purpose specified.

2. The needle-head C, as described, provided with the combined screw-boss, journal $c$, set-screw $c'$, and needle opening $c''$, substantially as and for the purpose shown.

3. The shuttle-race N provided within one side with the T-shaped groove $n$, and within its upper side with a shuttle-groove, $n'$, and having at the lower side of the latter a longitudinal slot, $n''$, substantially as and for the purpose set forth.

4. The shuttle-carrier O fitted to or within the T-shaped groove $n$ of the side of the race N, and provided with arms $o$ and $o$ which extend upward and into the groove $n'$ of said race and engage with the ends of the shuttle Q, substantially as and for the purpose shown and described.

In testimony that I claim the foregoing I have hereunto set my hand this 26th day of December, 1874.

A. H. WAGNER.

Witnesses:
GEO. S. PRINDLE,
WILLIAM FITCH.